(12) United States Patent
Zhi et al.

(10) Patent No.: US 10,962,957 B2
(45) Date of Patent: Mar. 30, 2021

(54) COLLISION POSITION ESTIMATION DEVICE AND MACHINE LEARNING DEVICE

(71) Applicant: FANUC Corporation, Yamanashi (JP)

(72) Inventors: Chao Zhi, Yamanashi (JP); Kazuhiro Satou, Yamanashi (JP); Keita Hada, Yamanashi (JP); Takeshi Sumi, Yamanashi (JP); Ryutaro Ishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 60 days.

(21) Appl. No.: 16/286,593

(22) Filed: Feb. 27, 2019

(65) Prior Publication Data

US 2019/0278251 A1   Sep. 12, 2019

(30) Foreign Application Priority Data

Mar. 6, 2018 (JP) .............................. JP2018-039244

(51) Int. Cl.
  *G05B 19/4061*  (2006.01)
  *G06N 20/00*    (2019.01)
  *G05B 19/402*   (2006.01)

(52) U.S. Cl.
  CPC ....... *G05B 19/4061* (2013.01); *G05B 19/402* (2013.01); *G06N 20/00* (2019.01)

(58) Field of Classification Search
  CPC ... G05B 19/402; G05B 19/4061; G06N 20/00
  See application file for complete search history.

(56) References Cited

U.S. PATENT DOCUMENTS

| | | | | |
|---|---|---|---|---|
| 2007/0084120 A1* | 4/2007 | Kobayashi | ........... | H02H 7/0851 49/26 |
| 2014/0316569 A1* | 10/2014 | Monari | .............. | G05B 19/4061 700/255 |

(Continued)

FOREIGN PATENT DOCUMENTS

| JP | 2016-68183 A | 5/2016 |
|---|---|---|
| JP | 2018086715 A | 6/2018 |
| JP | 2019012392 A | 1/2019 |

OTHER PUBLICATIONS

Google, Machine Translation of JP2016068183A (obtained from <<https://patents.google.com/patent/JP2016068183A/en?oq=jp2016068183>> on Jun. 20, 2020) (Year: 2016).*

*Primary Examiner* — Michael J Huntley
(74) *Attorney, Agent, or Firm* — Hauptman Ham, LLP

(57) ABSTRACT

A collision position estimation device allowing extraction of data related to a torque of a section related to collision of a cushion member includes a machine learning device. The machine learning device includes a state observation unit for observing axis movement data indicating information related to movement of the axis and motor torque data indicating data related to torque of a motor driving the axis as a state variable representing a current state of an environment, a label data acquisition unit for acquiring collision position data indicating the position of the axis during collision of the cushion member as label data, and a learning unit for associating and learning the information related to movement of the axis and the data related to the torque of the motor driving the axis with the position of the axis during collision of the cushion member using the state variable and the label data.

13 Claims, 8 Drawing Sheets

(56) References Cited

U.S. PATENT DOCUMENTS

| | | | |
|---|---|---|---|
| 2015/0368082 A1* | 12/2015 | Davis | B66F 11/042 |
| | | | 701/50 |
| 2017/0031329 A1* | 2/2017 | Inagaki | B25J 9/163 |
| 2017/0357242 A1* | 12/2017 | Watanabe | B25J 9/1666 |
| 2018/0143162 A1 | 5/2018 | Kurokami et al. | |
| 2019/0005413 A1 | 1/2019 | Sato | |

* cited by examiner

COLLISION POSITION ESTIMATION DEVICE AND MACHINE LEARNING DEVICE

RELATED APPLICATION

The present application claims priority to Japanese Application Number 2018-039244 filed Mar. 6, 2018, the disclosure of which is hereby incorporated by reference herein in its entirety.

BACKGROUND OF THE INVENTION

1. Field of the Invention

The application relates to a collision position estimation device and a machine learning device.

2. Description of the Related Art

A telescopic cover is a cover for protecting an internal mechanism of a machine tool from chips and cutting fluid generated when the machine tool performs machining. This telescopic cover has a structure that opens and closes a cover by driving a multistage metal cover using a telescopic member such as a pantograph or a spring.

FIGS. 6 and 7 are diagrams illustrating a schematic structure of a machine tool having a telescopic cover 201. The telescopic cover 201 illustrated in FIGS. 6 and 7 is configured as a multistage cover of an upper cover 201A and a lower cover 201B. In the telescopic cover 201 in this example, one end of the upper cover 201A and one end of the lower cover 201B are bound by an elastic member 202 such as a spring, the one end of the upper cover 201A is fixed to a stage 203, and a cushion member 204 such as rubber is attached to the one end of the lower cover 201B to protect the cover from collision.

Moving the stage 203 of the machine tool including such a telescopic cover 201 using a servomotor 50 is considered. The stage 203 of the machine tool illustrated in FIG. 6 is located on a left side in the drawing. Here, when the servomotor 50 is driven via a coupling 209 and a bearing 210 to rotate a ball screw 205, and the stage 203 is moved to a right side in the drawing, the upper cover 201A of the telescopic cover 201 moves in accordance with movement of the stage 203, and the lower cover 201B on the left side moves to the right side by an elastic force of the elastic member 202 pressed by a stopper 206 and the upper cover 201A and a pulling force from the upper cover 201A. Further, as illustrated in FIG. 7, the cushion member 204 on the left side collides with a foundry stand 207.

When such a collision is repeated, the cushion member is worn. However, when this cushion member is left without change, the cushion member will not function as a cushion due to wear, and the cover collides with a part of the machine tool, etc., which causes a failure of the cover or the machine tool. Thus, there is a need for a mechanism for predicting occurrence of an abnormality based on excessive wear of the cushion member. For example, a technology disclosed in Japanese Patent Application laid-Open No. 2016-68183 describes a method of detecting a state of an abnormality in telescopic motion of a telescopic cover as soon as possible when the abnormality occurs. In this method, a light emitting portion and a light receiving portion are provided inside the telescopic cover, and it is determined that an abnormality has occurred when light generated by the light emitting portion is blocked by a plate body and not received by the light receiving portion.

However, according to the method described in Japanese Patent Application laid-Open No. 2016-68183, only an abnormality such as deformation of a presumed aspect of a presumed member can be detected. In addition, the technology disclosed in Japanese Patent Application laid-Open No. 2016-68183 can merely obtain an effect that an abnormality can be detected at an early stage when the abnormality occurs, and cannot obtain an effect that occurrence of an abnormality is predicted by catching an event that leads to the occurrence of the abnormality.

As an example of a technology for predicting occurrence of an abnormality, for example, it is conceivable to mechanically learn data related to a torque measured at the time of collision of a cushion member using a machine learning device, etc., and predict occurrence of an abnormality based on a change of data related to a torque according to wear of the cushion member.

FIG. 8 is a diagram illustrating temporal changes of a position command for the servomotor of the machine tool illustrated in FIGS. 6 and 7 and a torque command corresponding to data related to a torque detected from the servomotor. In FIG. 8, t1 is a time at which the stage of the machine tool starts to move the stage from a position illustrated in FIG. 6, and t2 is a time corresponding to a position illustrated in FIG. 7, that is, a time at which the cushion member collides with the foundry stand. In addition, t3 is a time at which vibration generated when the cushion member collides with the foundry stand decreases. Subsequently, the stage is moved to the left from t3. t4 is a time at which the stage returns to the position illustrated in FIG. 6 again, that is, a time at which a cushion member on the opposite side collides with a foundry stand. In addition, t5 is a time at which vibration generated when the cushion member collides with the foundry stand decreases. In general, in machine learning of a state (normal/abnormal) of the cushion member, data of a torque command in the vicinity of t2 to t3 or a torque command in the vicinity of t4 to t5 corresponding to data of a part related to collision of the cushion member in the data of the torque command illustrated in FIG. 8 is needed. In addition, data of a torque command detected at other times causes degradation in accuracy of machine learning, and thus is not desired to be used as much as possible, which is a problem.

However, segmentation of such data is relatively easy when a moment of collision of the cushion member is clearly known. However, in the case of the telescopic cover having the structure illustrated in FIGS. 6 and 7, an aspect of movement varies depending on the moving speed or the position of the stage, the frictional force between covers, etc. Thus, the position of collision of the cushion member is not determined to be constant depending on the position of the stage, and segmentation of the data related to collision of the cushion member against the foundry stand is difficult. In addition, in this example, as illustrated immediately after t1 and immediately after t3 of a graph of the torque command of FIG. 8, since a torque command at the time of starting movement of the servomotor in a normal operation is large, there is a problem that it is impossible to distinguish between a time at which the servomotor starts to be moved and a time at which collision of the cushion member occurs merely by the magnitude of the torque command.

SUMMARY OF THE INVENTION

In this regard, an object of the application is to provide a collision position estimation device and a machine learning device allowing extraction of data related to a torque of a section related to collision of a cushion member.

In the application, the above problem is solved by estimating a collision position of a cushion member of a telescopic cover using a machine learning scheme.

Further, an aspect of the application is a collision position estimation device for estimating a position of a axis of a machine tool during collision of a cushion member included in a telescopic cover, the collision position estimation device including a machine learning device for learning the position of the axis during collision of the cushion member, in which the machine learning device includes a state observation unit for observing axis movement data indicating information related to movement of the axis and motor torque data indicating data related to a torque of a motor driving the axis as a state variable representing a current state of an environment, a label data acquisition unit for acquiring collision position data indicating the position of the axis during collision of the cushion member as label data, and a learning unit for associating and learning the information related to movement of the axis and the data related to the torque of the motor driving the axis with the position of the axis during collision of the cushion member using the state variable and the label data.

Another aspect of the application is a collision position estimation device for estimating a position of an axis of a machine tool during collision of a cushion member included in a telescopic cover, the collision position estimation device including a machine learning device learning the position of the axis during collision of the cushion member, in which the machine learning device includes a state observation unit for observing axis movement data indicating information related to movement of the axis and motor torque data indicating data related to a torque of a motor driving the axis as a state variable representing a current state of an environment, a learning unit associating and learning the information related to movement of the axis and the data related to the torque of the motor driving the axis with the position of the axis during collision of the cushion member, and an estimation result output unit for outputting a result of estimating collision position data indicating the position of the axis during collision of the cushion member based on a state variable observed by the state observation unit and a learning result by the learning unit.

Another aspect of the application is a machine learning device for learning a position of an axis of a machine tool during collision of a cushion member included in a telescopic cover, the machine learning device including a state observation unit for observing axis movement data indicating information related to movement of the axis and motor torque data indicating data related to a torque of a motor driving the axis as a state variable representing a current state of an environment, a label data acquisition unit for acquiring collision position data indicating the position of the axis during collision of the cushion member as label data, and a learning unit for associating and learning the information related to movement of the axis and the data related to the torque of the motor driving the axis with the position of the axis during collision of the cushion member using the state variable and the label data.

Another aspect of the application is a machine learning device for learning a position of an axis of a machine tool during collision of a cushion member included in a telescopic cover, the machine learning device including a state observation unit for observing axis movement data indicating information related to movement of the axis and motor torque data indicating data related to a torque of a motor driving the axis as a state variable representing a current state of an environment, a learning unit associating and learning the information related to movement of the axis and the data related to the torque of the motor driving the axis with the position of the axis during collision of the cushion member, and an estimation result output unit for outputting a result of estimating collision position data indicating the position of the axis during collision of the cushion member based on a state variable observed by the state observation unit and a learning result by the learning unit.

According to the application, it is possible to estimate the collision position of the cushion member of the telescopic cover. Thus, it is possible to easily extract data related to a torque such as a torque command related to collision based on the estimated collision position, and it is possible to accurately detect abnormality of the cushion member by further machine learning using the extracted data related to the torque.

BRIEF DESCRIPTION OF THE DRAWINGS

The above-described object and characteristic of the application and other objects and characteristics will be clear from description of embodiments below with reference to accompanying drawings. In the drawings.

DETAILED DESCRIPTION OF THE PREFERRED EMBODIMENTS

Hereinafter, an embodiment of the application will be described with reference to drawings.

Figure 1:
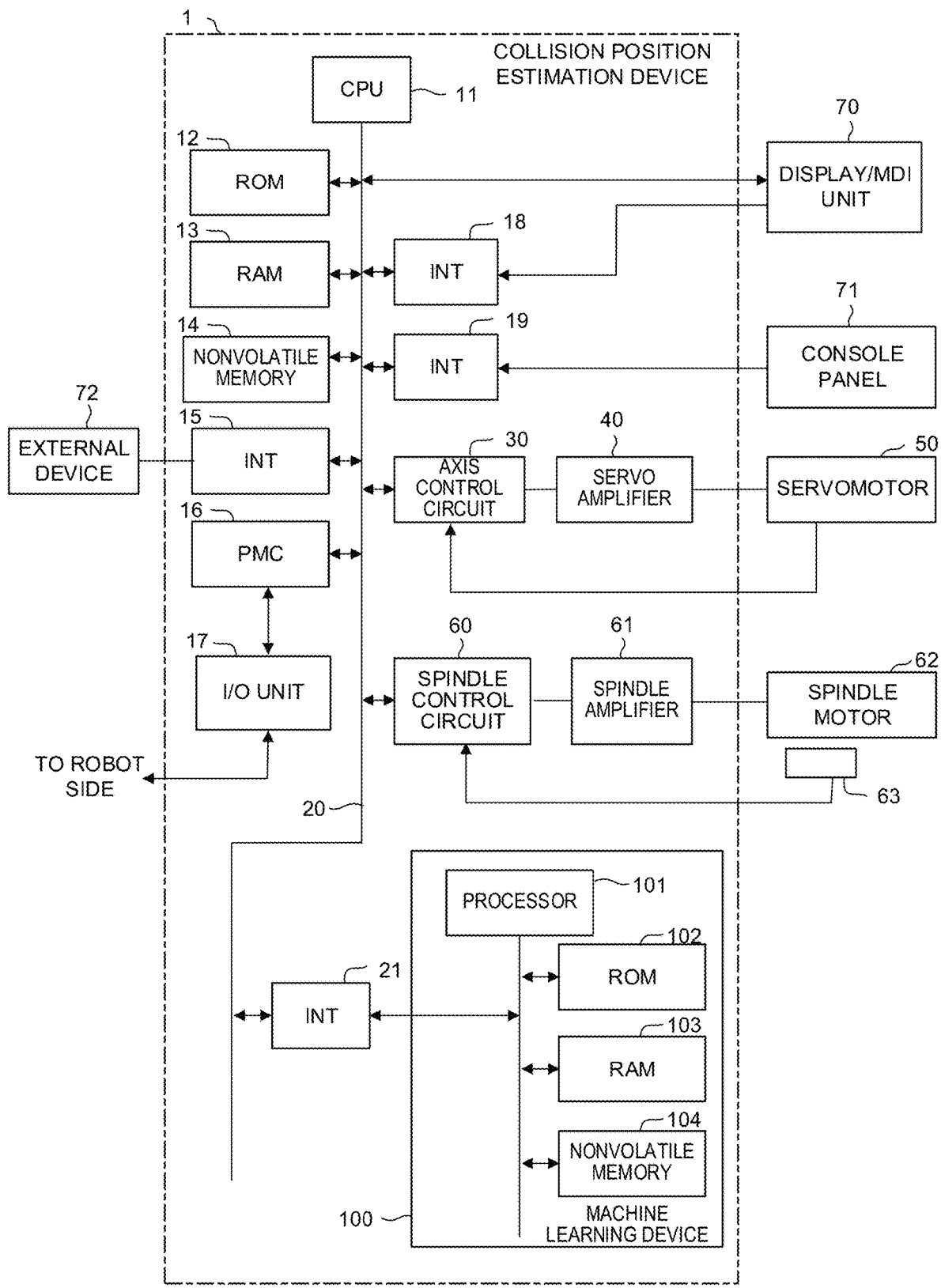
FIG. 1 is a schematic hardware configuration diagram of a collision position estimation device according to a first embodiment.

FIG. 1 is a schematic hardware configuration diagram illustrating a main part of a collision position estimation device according to a first embodiment. For example, a collision position estimation device 1 can be mounted as a controller that controls a manufacturing machine such as a machine tool. Alternatively, for example, the collision position estimation device 1 can be mounted as a personal computer attached to a controller that controls a manufacturing machine such as a machine tool or a computer such as a cell computer, a host computer, an edge server, a cloud server, etc. connected to the controller via a wired/wireless network. The present embodiment illustrates an example of a case in which the collision position estimation device 1 is mounted as the controller that controls the machine tool including the telescopic cover illustrated in FIGS. 6 and 7, etc.

A central processing unit (CPU) 11 included in the collision position estimation device 1 according to the present embodiment is a processor that controls the collision position estimation device 1 as a whole. The CPU 11 reads a system program stored in a read only memory (ROM) 12 via a bus 20, and controls the entire collision position estimation device 1 according to the system program. A random access memory (RAM) 13 temporarily stores temporary computation data and display data, various data input by an operator via an input unit (not illustrated), etc.

For example, a nonvolatile memory 14 is configured as a memory that is kept in a storage state even when a power source of the collision position estimation device 1 is turned OFF by being backed up by a battery (not illustrated).

The nonvolatile memory 14 stores a control program read from an external device 72 via an interface 15, a control program input via a display/manual data input (MDI) unit 70, and various data acquired from each part or the machine tool of the collision position estimation device 1 (for example, a position or a speed of a servomotor 50, a position command for the servomotor 50, a speed command, data related to a torque detected from the servomotor 50, etc.). The control program and the various data stored in the nonvolatile memory 14 may be loaded in the RAM 13 during execution/during use. In addition, various system programs such as a known analysis program, etc. (including a system program for controlling exchange with a machine learning device 100 described below) are written to the ROM 12 in advance.

The interface 15 is an interface for connecting the collision position estimation device 1 and the external device 72 such as an adapter to each other. A control program, various parameters, etc. are read from the external device 72 side. In addition, a program edited in the collision position estimation device 1, various parameters, etc. can be stored in external storage means via the external device 72. A programmable machine controller (PMC) 16 outputs a signal to the machine tool and a peripheral device of the machine tool via an input/output (I/O) unit 17 by a sequence program built in the collision position estimation device 1 to perform a control operation. In addition, the PCM 16 receives signals of various switches or sensors etc. of a console panel provided in a main body of the machine tool, performs necessary signal processing, and then delivers the signals to the CPU 11.

The display/MDI unit 70 is a manual data input device including a display, a keyboard, etc., and an interface 18 receives a command and data from the keyboard of the display/MDI unit 70 and delivers the received command and data to the CPU 11. An interface 19 is connected to a console panel 71 including a manual pulse generator, etc. used for manually driving each axis.

An axis control circuit 30 for controlling each axis which moves each axis of the machine tool receives a movement command amount of the axis from the CPU 11 and outputs a command of the axis to a servo amplifier 40. The servo amplifier 40 receives this command and drives a servomotor 50 that moves the axis included in the machine tool. The servomotor 50 of the axis incorporates a position/speed detector, and feeds back a position/speed feedback signal from this position/speed detector to the axis control circuit 30, thereby performing feedback control of a position/speed. In the hardware configuration diagram of FIG. 1, only one axis control circuit 30, one servo amplifier 40, and one servomotor 50 are illustrated. However, in practice, each of the number of axis control circuits, the number of servo amplifiers, and the number of servomotors to be prepared corresponds to the number of axes included in the machine tool to be controlled (for example, three in the case of the machine tool including XYZ axes).

Figure 6:
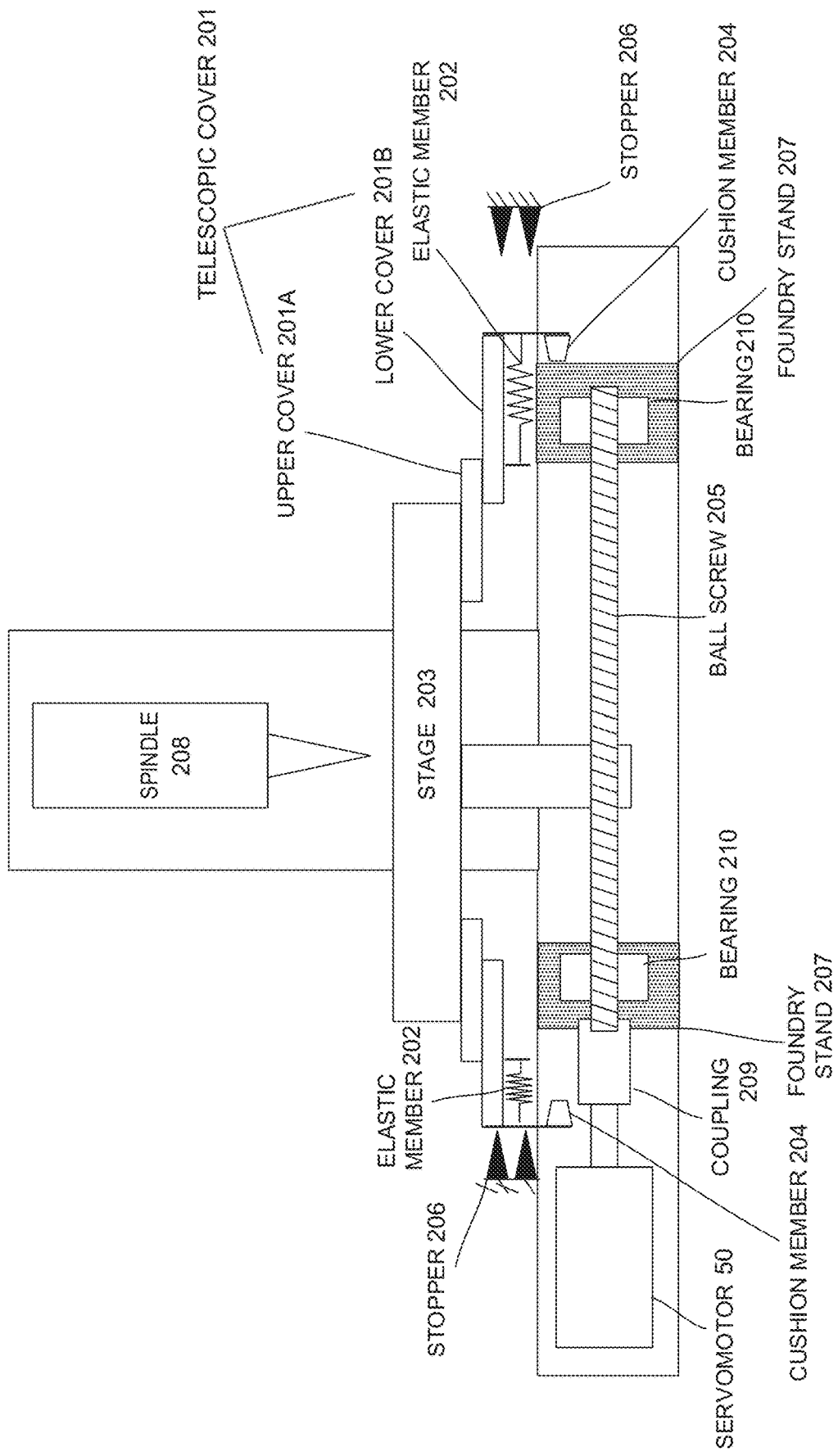
FIG. 6 is a diagram describing an operation of a machine tool including a telescopic cover.
Figure 7:
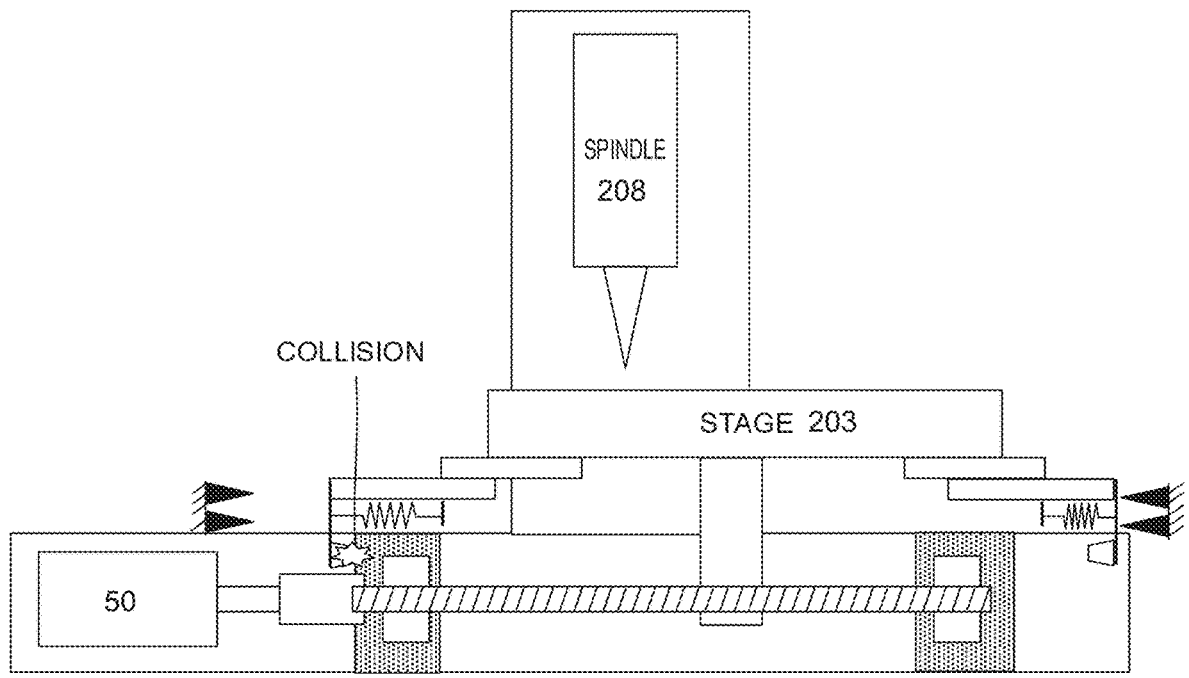
FIG. 7 is a diagram describing an operation of the machine tool including the telescopic cover.

A spindle control circuit 60 receives a spindle rotation command to a spindle 208 shown in FIGS. 6 and 7 mounted on the machine tool and outputs a spindle speed signal to a spindle amplifier 61. The spindle amplifier 61 receives this spindle speed signal, and rotates a spindle motor 62 of the spindle at a commanded rotation speed to drive a tool. A position coder 63 is coupled to the spindle motor 62, the position coder 63 outputs a feedback pulse in synchronization with rotation of the spindle, and the feedback pulse is read by the CPU 11.

An interface 21 is an interface for connecting the collision position estimation device 1 and the machine learning device 100 to each other. The machine learning device 100 includes a processor 101 that controls the entire machine learning device 100, a ROM 102 that stores a system programs, etc., a RAM 103 that performs temporary storage in each process related to machine learning, and a nonvolatile memory 104 used for storing a learning model, etc. The machine learning device 100 can observe each piece of information (for example, a position and a speed of the servomotor 50, a position command and a speed command for the servomotor 50, data related to a torque detected from the servomotor 50, etc.) obtainable by the collision position estimation device 1 via the interface 21. In addition, the collision position estimation device 1 receives an estimated value of a collision position of a cushion member output from the machine learning device 100 and performs processing such as segmentation of data related to a torque acquired from the machine tool.

Figure 2:
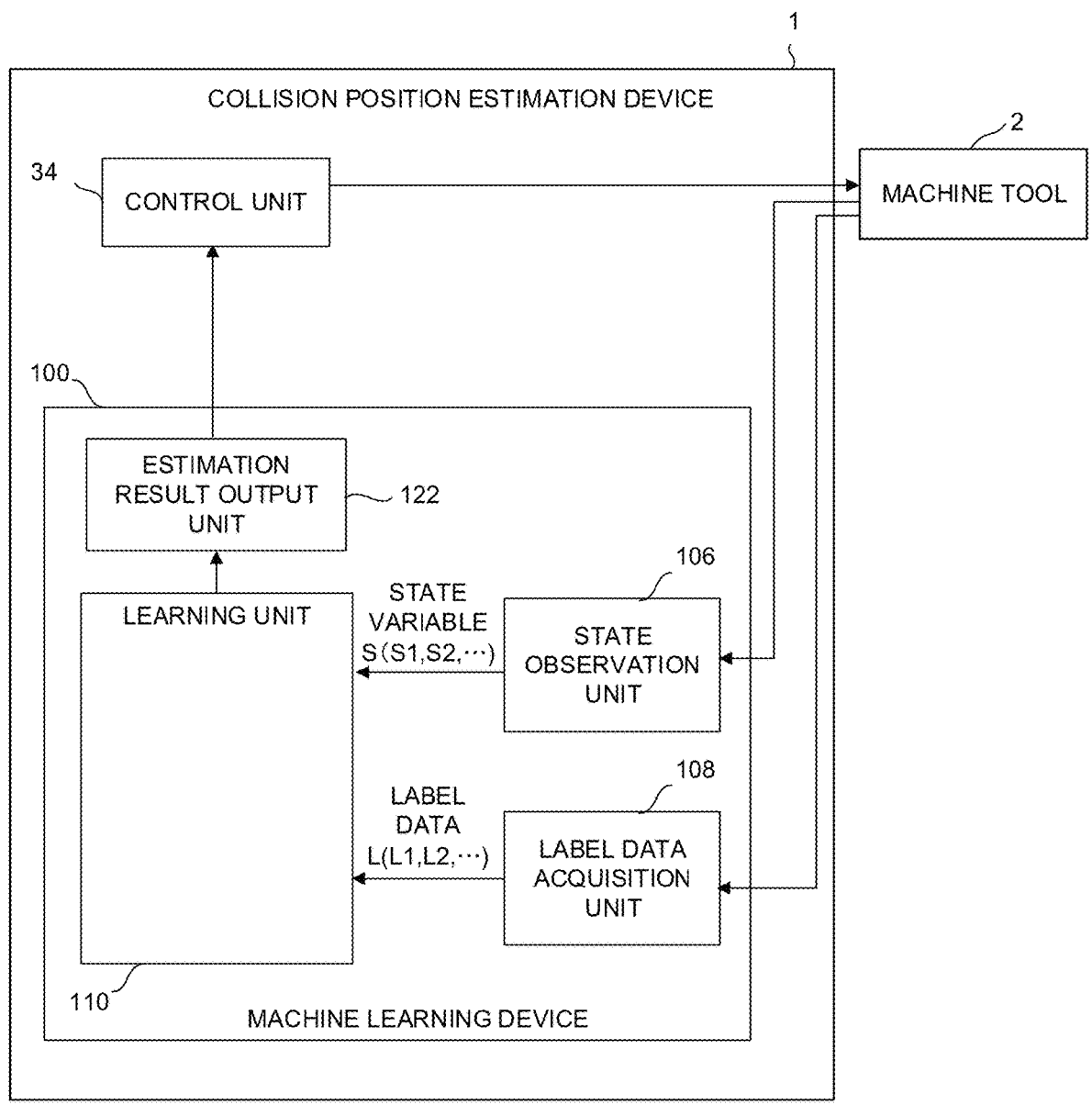
FIG. 2 is a schematic function block diagram of the collision position estimation device according to the first embodiment.

FIG. 2 is a schematic function block diagram of the collision position estimation device 1 and the machine learning device 100 according to the first embodiment. Each function block illustrated in FIG. 2 is realized by each of the CPU 11 included in the collision position estimation device 1 illustrated in FIG. 1 and the processor 101 of the machine learning device 100 executing a system program to control an operation of each unit of the collision position estimation device 1 and the machine learning device 100.

The collision position estimation device 1 of the present embodiment includes a control unit 34 that controls a machine tool 2 based on a control program stored in the nonvolatile memory 14. For example, the control unit 34 performs machining of a workpiece by controlling an operation of the machine tool 2 based on a machining condition and a command designated by the control program, etc. The machine tool 2 includes the telescopic cover, and the telescopic cover also operates when the servomotor 50 moves a stage based on a command output by the control unit 34.

Meanwhile, the machine learning device 100 included in the collision position estimation device 1 has software (learning algorithm, etc.) and hardware (processor 101, etc.) for self-learning of estimation of an axis position of the machine tool 2 at the time of collision of the cushion member of the telescopic cover with respect to information related to movement of the axis included in the machine tool 2 and data related to a torque of the servomotor 50 driving the axis by so-called machine learning. An object learned by the machine learning device 100 included in the collision position estimation device 1 corresponds to a model structure representing a correlation between the information related to movement of the axis included in the machine tool 2 and the data related to the torque of the servomotor 50 driving the axis, and the axis position of the machine tool 2 at the time of collision of the cushion member of the telescopic cover.

As illustrated by function blocks in FIG. 2, the machine learning device 100 included in the collision position estimation device 1 includes a state observation unit 106 for observation as a state variable S representing a current state of an environment including axis movement data S1 indicating information related to movement of the axis included in the machine tool 2 and motor torque data S2 indicating data related to the torque of the servomotor, a label data acquisition unit 108 that acquires label data L including collision position data L1 indicating the axis position of the machine tool 2 at the time of collision of the cushion member of the telescopic cover, a learning unit 110 that associates and learns the information related to movement of the axis included in the machine tool 2 and the data related to the torque of the servomotor 50 driving the axis with the axis position of the machine tool 2 at the time of collision of the cushion member of the telescopic cover using the state variable S and the label data L, and an estimation result output unit 122 that outputs the axis position of the machine tool 2 at the time of collision of the cushion member of the telescopic cover estimated from the information related to movement of the axis included in the machine tool 2 and the data related to the torque of the servomotor 50 driving the axis using a learned model by the learning unit 110.

The state observation unit 106 acquires the axis movement data S1 and the motor torque data S2 as the state variable S from the machine tool 2 at the time of learning by the learning unit 110. In addition, the state observation unit 106 acquires the axis movement data S1 and the motor torque data S2 as the state variable S from the machine tool 2 at the time of estimation of the axis position of the machine tool 2 at the time of collision of the cushion member of the telescopic cover using a learning result of the learning unit 110. In either case, instead of directly acquiring data from the machine tool 2, data may be acquired via the nonvolatile memory 14, etc. included in the collision position estimation device 1.

As the axis movement data S1 in the state variable S observed by the state observation unit 106, in the case of being most simply configured, for example, it is possible to use a position command for the axis of the machine tool 2 and a feed speed of the axis. For example, the position command for the axis of the machine tool 2 may be acquired from a command by a control program executed by the control unit 34. In addition, for example, the feed speed of the axis of the machine tool 2 may be acquired from a machining condition set in the collision position estimation device 1 as the controller or the command by the control program executed by the control unit 34.

Figure 8:
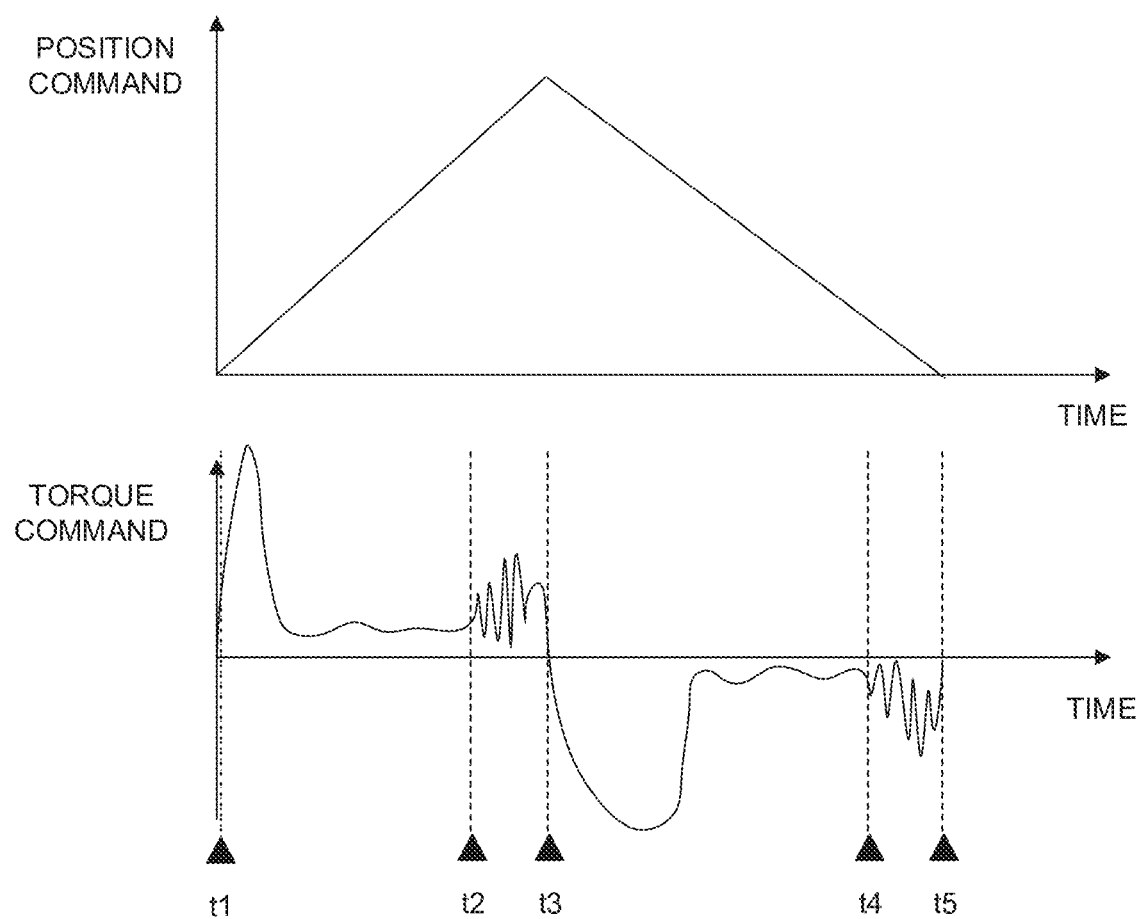
FIG. 8 is a diagram showing a torque command related to movement of an axis of the machine tool including the telescopic cover.

Meanwhile, as the motor torque data S2 in the state variable S observed by the state observation unit 106, in the case of being most simply configured, for example, it is possible to use a torque command of the servomotor 50 driving the axis of the machine tool 2. Alternatively, as the motor torque data S2, it is possible to use a torque value obtained based on a current value of the servomotor 50, etc. A frictional force between respective covers included in the telescopic cover affects the data related to the torque of the servomotor 50 driving the axis of the machine tool 2. Thus, when the frictional force is used as a state variable, it is possible to reflect the frictional force, etc. between the respective covers included in the telescopic cover in learning and estimation of the learning unit 110. As an example of the motor torque data S2, it is desirable to use an average value of absolute values of torque values in a part in which fluctuation of a transitional torque value after start of movement of the axis (after t1) becomes low and substantially flat in the torque command illustrated in FIG. 8.

The label data acquisition unit 108 acquires the label data L that includes the collision position data L1 indicating the axis position of the machine tool 2 at the time of collision of the cushion member of the telescopic cover as the label data L at the time of learning of the learning unit 110. For example, the collision position data L1 may be calculated based on a position of the axis included in the machine tool 2 and a position of the telescopic cover (of a member to which the cushion member is attached) detected by a sensor such as a touch probe or a laser interferometer installed around the telescopic cover. For example, in the case of the telescopic cover illustrated in FIGS. 6 and 7, the sensor is installed in a lateral direction (a position at which a stopper is present), and a position of the axis of the machine tool 2 at the time when the lower cover moves to a predetermined position is used as the collision position data L1. In the telescopic cover illustrated in FIGS. 6 and 7, when the cushion member is in a normal state, a position of the lower cover at the time when the cushion member collides with the foundry stand is constant at all times, and thus an axis position of the machine tool 2 at the time of collision of the cushion member of the telescopic cover may be detected using this point.

The label data acquisition unit 108 is an indispensable configuration in a stage of learning by the learning unit 110 and is not an indispensable configuration after completion of learning by the learning unit 110 associating the information related to movement of the axis included in the machine tool 2 and the data related to the torque of the servomotor 50 driving the axis with the axis position of the machine tool 2 at the time of collision of the cushion member of the telescopic cover. For example, in the case of shipping the machine learning device 100 completing learning to a customer, etc., the label data acquisition unit 108 may be detached and shipped.

The learning unit 110 learns the label data L (the collision position data L1 indicating the axis position of the machine tool 2 at the time of collision of the cushion member of the telescopic cover) with respect to the state variable S (the axis movement data S1 indicating the information related to movement of the axis included in the machine tool 2 and the motor torque data S2 indicating the data related to the torque of the servomotor) according to an arbitrary learning algorithm, a general term for which is machine learning. For example, the learning unit 110 can learn a correlation between the axis movement data S1 and the motor torque data S2 included in the state variable S, and the collision position data L1 included in the label data L. The learning unit 110 can repeatedly execute learning based on a data set including the state variable S and the label data L.

In learning by the learning unit 110, it is desirable to execute a plurality of learning cycles based on data obtained for each of movements of axes by a plurality of machine tools 2. By repeating such a learning cycle, the learning unit 110 automatically interprets the correlation between the information related to movement of the axis included in the machine tool 2 (the axis movement data S1) and the data related to the torque of the servomotor 50 driving the axis (the motor torque data S2), and the axis position of the machine tool 2 at the time of collision of the cushion member of the telescopic cover (the collision position data L1). At start of the learning algorithm, the correlation of the collision position data L1 with respect to the axis movement data S1 and the motor torque data S2 is substantially unknown. However, it is possible to interpret the correlation of the collision position data L1 with respect to the axis movement data S1 and the motor torque data S2 by gradually interpreting a relationship of the collision position data L1 with respect to the axis movement data S1 and the motor torque data S2 and using a learning model obtained as a result thereof as the learning unit 110 advances learning.

The estimation result output unit 122 estimates the axis position of the machine tool 2 at the time of collision of the cushion member of the telescopic cover and outputs the estimated axis position of the machine tool 2 at the time of collision of the cushion member of the telescopic cover based on the information related to movement of the axis included in the machine tool 2 and the data related to the torque of the servomotor 50 driving the axis based on a result (learned model) learned by the learning unit 110. The collision position data L1 indicating the axis position of the machine tool 2 at the time of collision of the cushion member of the telescopic cover associated with the axis movement data S1 indicating the information related to movement of the axis included in the machine tool 2 and the motor torque data S2 indicating the data related to the torque of the servomotor 50 driving the axis and learned by the learning unit 110 is used to estimate a state (normal/abnormal) of the cushion member included in the telescopic cover installed in the machine tool 2 (by another machine learning device).

Figure 3:
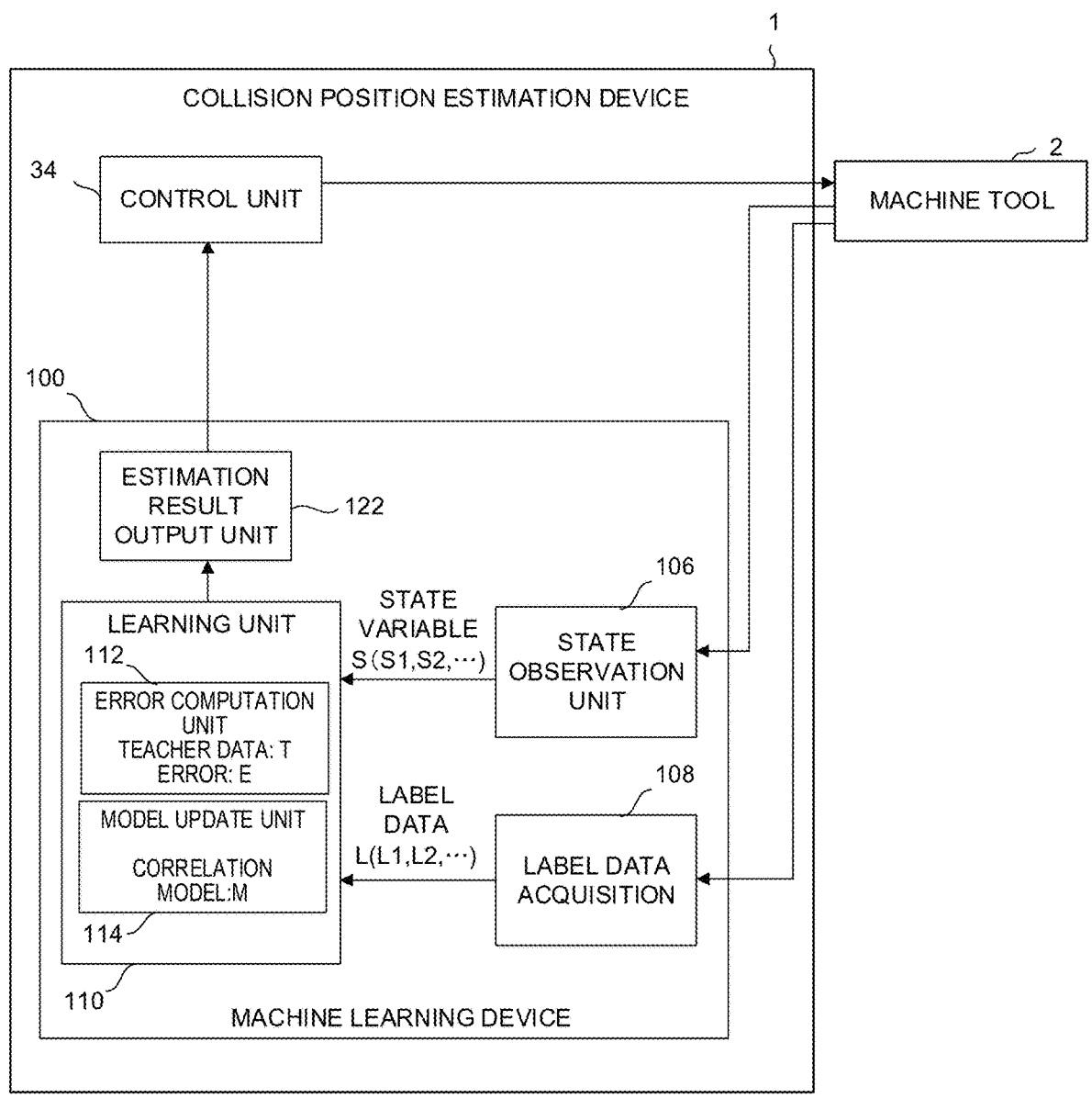
FIG. 3 is a schematic function block diagram illustrating a mode of the collision position estimation device.

In the machine learning device 100 having the above-described configuration, a learning algorithm executed by the learning unit 110 is not particularly restricted, and it is possible to employ a known learning algorithm as machine learning. FIG. 3 corresponds to another mode of the collision position estimation device 1 illustrated in FIG. 2 and illustrates a configuration including the learning unit 110 that performs supervised learning as another example of the learning algorithm. The supervised learning corresponds to a scheme in which a known data set (referred to as teacher data) of an input and an output corresponding thereto is given, and a characteristic implying a correlation between the input and output is identified from the teacher data, thereby learning a correlation model for estimating a required output with respect to a new input.

In the machine learning device 100 included in the collision position estimation device 1 illustrated in FIG. 3, the learning unit 110 includes an error computation unit 112 that computes an error E between a correlation model M estimating the axis position of the machine tool 2 at the time of collision of the cushion member of the telescopic cover from the information related to movement of the axis included in the machine tool 2 and a correlation characteristic identified from teacher data T obtained from a result of the axis position of the machine tool 2 at the time of collision of the cushion member of the telescopic cover from the information related to movement of the axis included in the machine tool 2 and the data related to the torque of the servomotor obtained in the past and information related to movement of the axis included in the machine tool 2 detected by a sensor, etc. and a model update unit 114 that updates the correlation model M to reduce the error E. The learning unit 110 learns estimation of the axis position of the machine tool 2 at the time of collision of the cushion member of the telescopic cover from the information related to movement of the axis included in the machine tool 2 and the data related to the torque of the servomotor 50 driving the axis by the model update unit 114 repeating update of the correlation model M.

For example, an initial value of the correlation model M represents a correlation between the state variable S and the label data L in a simplified manner (for example, as an nth order function), and is fed to the learning unit 110 before starting the supervised learning. In the application, as described above, the information related to movement of the axis included in the machine tool 2 and the data related to the torque of the servomotor 50 driving the axis obtained in the past and the data of the axis position of the machine tool 2 at the time of collision of the cushion member of the telescopic cover from the information related to movement of the axis included in the machine tool 2 detected by the sensor, etc. may be used as the teacher data T, and the teacher data T is fed to the learning unit 110 at any time during operation of the collision position estimation device 1. The error computation unit 112 identifies a correlation characteristic implying a correlation between the information related to movement of the axis included in the machine tool 2 and the data related to the torque of the servomotor 50 driving the axis, and the axis position of the machine tool 2 at the time of collision of the cushion member of the telescopic cover by the teacher data T fed to the learning unit 110 at any time, and obtains the error E between this correlation characteristic and the correlation model M corresponding to the state variable S and the label data L in the current state. For example, the model update unit 114 updates the correlation model M in a direction in which the error E decreases according to a predetermined update rule.

In a subsequent learning cycle, the axis position of the machine tool 2 at the time of collision of the cushion member of the telescopic cover is estimated using the state variable S according to the correlation model M after update, the error computation unit 112 obtains an error E between a result of the estimation and actually obtained label data L, and the model update unit 114 updates the correlation model M again. In this way, a correlation between a current state of an environment and estimation with respect thereto, which has not been known, becomes gradually evident.

When the above-described supervised learning is in progress, it is possible to use a neural network.

Figure 4A:
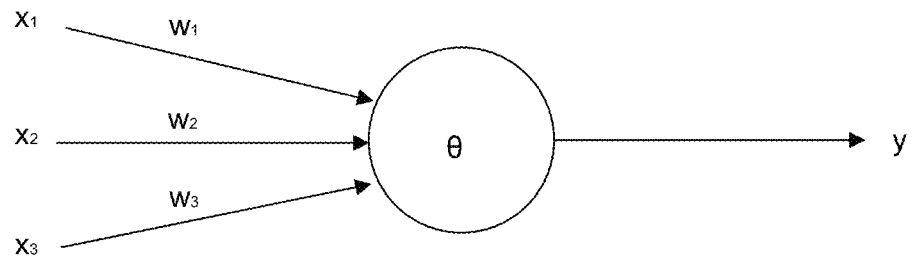
FIG. 4A is a diagram describing a neuron.
Figure 4B:
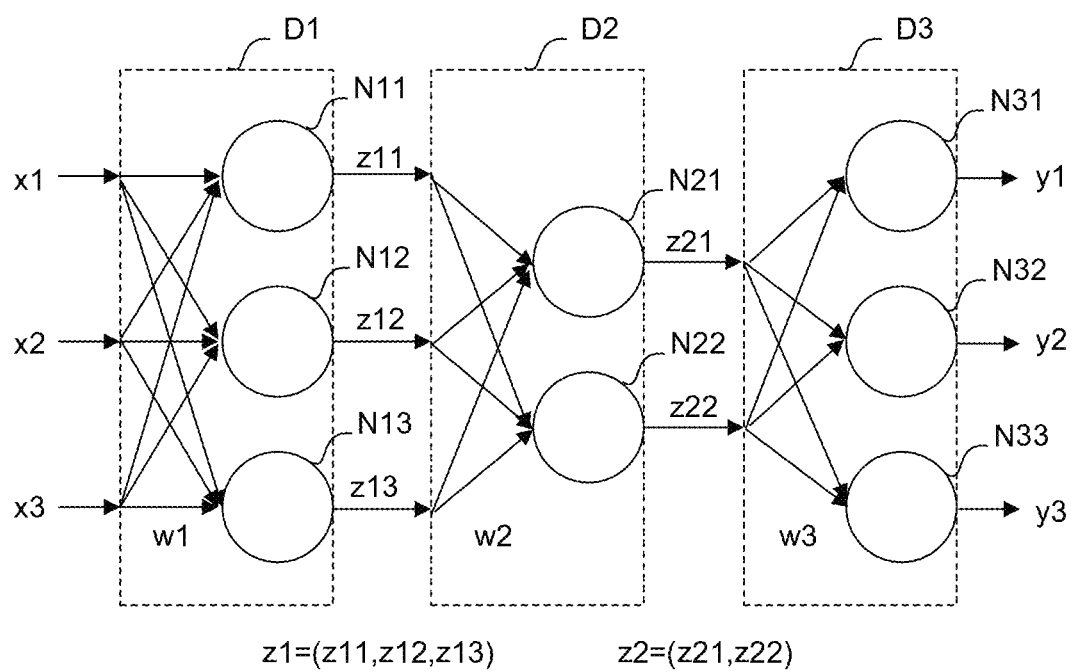
FIG. 4B is a diagram describing a neural network.

FIG. 4A schematically illustrates a model of a neuron. FIG. 4B schematically illustrates a model of a three-layer neural network constructed by combining neurons illustrated in FIG. 4A. For example, the neural network can be constituted by an arithmetic unit, a storage unit, etc. imitating a model of a neuron.

The neuron illustrated in FIG. 4A outputs a result y with respect to a plurality of inputs x (here, as an example, an input $x_1$ to an input $x_3$). Each of the inputs $x_1$ to $x_3$ is multiplied by a weight w ($w_1$ to $w_3$) corresponding to the input x. In this way, the neuron outputs the output y expressed by Equation 1 below. In Equation 1, all the input x, the output y, and the weight w correspond to vectors. In addition, θ denotes a bias, and $f_k$ denotes an activation function.

$$y = f_k(\Sigma_{i=1}^{n} x_i w_i - \theta) \qquad \text{[Equation 1]}$$

In the three-layer neural network illustrated in FIG. 4B, a plurality of inputs x (here, as an example, an input x1 to an input x3) is input from a left side, and results y (here, as an example, a result y1 to a result y3) are output from a right side. In the illustrated example, each of the inputs x1, x2, and x3 is multiplied by a corresponding weight (collectively represented by w1), and the individual inputs x1, x2, and x3 are input to three neurons N11, N12, and N13.

In FIG. 4B, outputs of the respective neurons N11 to N13 are collectively represented by z1. z1 may be regarded as a feature vector from which a feature quantity of the input vector is extracted. In the illustrated example, each of the feature vectors z1 is multiplied by a corresponding weight (collectively represented by w2), and the respective feature vectors z1 are input to two neurons N21 and N22. The feature vector z1 represents a feature between the weight w1 and the weight w2.

In FIG. 4B, outputs of the respective neurons N21 and N22 are collectively represented by z2. z2 may be regarded as a feature vector from which a feature quantity of the feature vector z1 is extracted. In the illustrated example, each of the feature vectors z2 is multiplied by a corresponding weight (collectively represented by w3), and the respective feature vectors z2 are input to three neurons N31, N32, and N33. The feature vector z2 represents a feature between the weight w2 and the weight w3. Finally, the neurons N31 to N33 output results y1 to y3, respectively.

It is possible to use a so-called deep learning scheme using a neural network that forms three or more layers.

In the machine learning device 100 included in the collision position estimation device 1, when the learning unit 110 performs an multi-structure operation according to the above-described neural network using a state variable S as an input x, it is possible to estimate the axis position of the machine tool 2 at the time of collision of the cushion member of the telescopic cover (output y) from the information related to movement of the axis included in the machine tool 2 and the data related to the torque of the servomotor 50 driving the axis (input x). Examples of an operation mode of the neural network include a learning mode and a value prediction mode. For example, a weight w may be learned using a learning data set in the learning mode, and a value of an action may be determined in the value prediction mode using the learned weight w. In the value prediction mode, it is possible to perform detection, classification, inference, etc.

The above-described configuration of the machine learning device 100 may be described as a machine learning method (or software) individually executed by the processor 101. This machine learning method is a machine learning method of learning (estimation of) the axis position of the machine tool 2 at the time of collision of the cushion member of the telescopic cover estimated from the information related to movement of the axis included in the machine tool 2 and the data related to the torque of the servomotor 50 driving the axis, and has a step of observing the information related to movement of the axis included in the machine tool 2 (the axis movement data S1) and the data related to the torque of the servomotor 50 driving the axis (the motor torque data S2) as the state variable S representing the current state, a step of acquiring the axis position of the machine tool 2 at the time of collision of the cushion member of the telescopic cover (the collision position data L1) as the label data L, and a step of associating and learning the axis movement data S1 and the motor torque data S2 with the axis position of the machine tool 2 at the time of collision of the cushion member of the telescopic cover using the state variable S and the label data L by the processor 101.

The learned model learned and obtained by the learning unit 110 of the machine learning device 100 may be used as a program module which is a part of software related to machine learning. The learned model of the application may be used in a computer including a processor such as a CPU or a graphic processing unit (GPU) and a memory. More specifically, the processor of the computer operates to perform calculation using the information related to movement of the axis included in the machine tool 2 and the data related to the torque of the servomotor 50 driving the axis as an input according to a command from the learned model stored in the memory, and output an estimation result of the axis position of the machine tool 2 at the time of collision of the cushion member of the telescopic cover based on a calculation result. The learned model of the application may be used by being copied to another computer via an external storage medium, a network, etc.

In addition, when the learned model of the application is copied to another computer and used in a new environment, further learning may be performed on the learned model based on a new state variable and label data obtained in the environment. In this case, it is possible to obtain a learned model (hereinafter referred to as a derived model) derived from the learned model based on the environment. The derived model of the application is the same as the original learned model in that an estimation result of the axis position of the machine tool 2 at the time of collision of the cushion member of the telescopic cover is output from the information related to movement of the axis included in the machine tool 2 and the data related to the torque of the servomotor 50 driving the axis, and is different therefrom in that a result more suitable for a new environment when compared to the original learned model is output. This derived model may be used by being copied to another computer via the external storage medium, the network, etc.

Further, it is possible to create and use a learned model (hereinafter referred to as a distillation model) obtained by performing learning from a start in another machine learning device using an output obtained with respect to an input to a machine learning device incorporating the learned model of the application (such a learning process is referred to as distillation). In distillation, the original learned model is also referred to as a teacher model, and a newly created distillation model is also referred to as a student model. In general, the distillation model is smaller in size than the original learned model and has the same accuracy as that of the original learned model, and thus is more suitable for distributing to another computer via the external storage medium, the network, etc.

Figure 5:
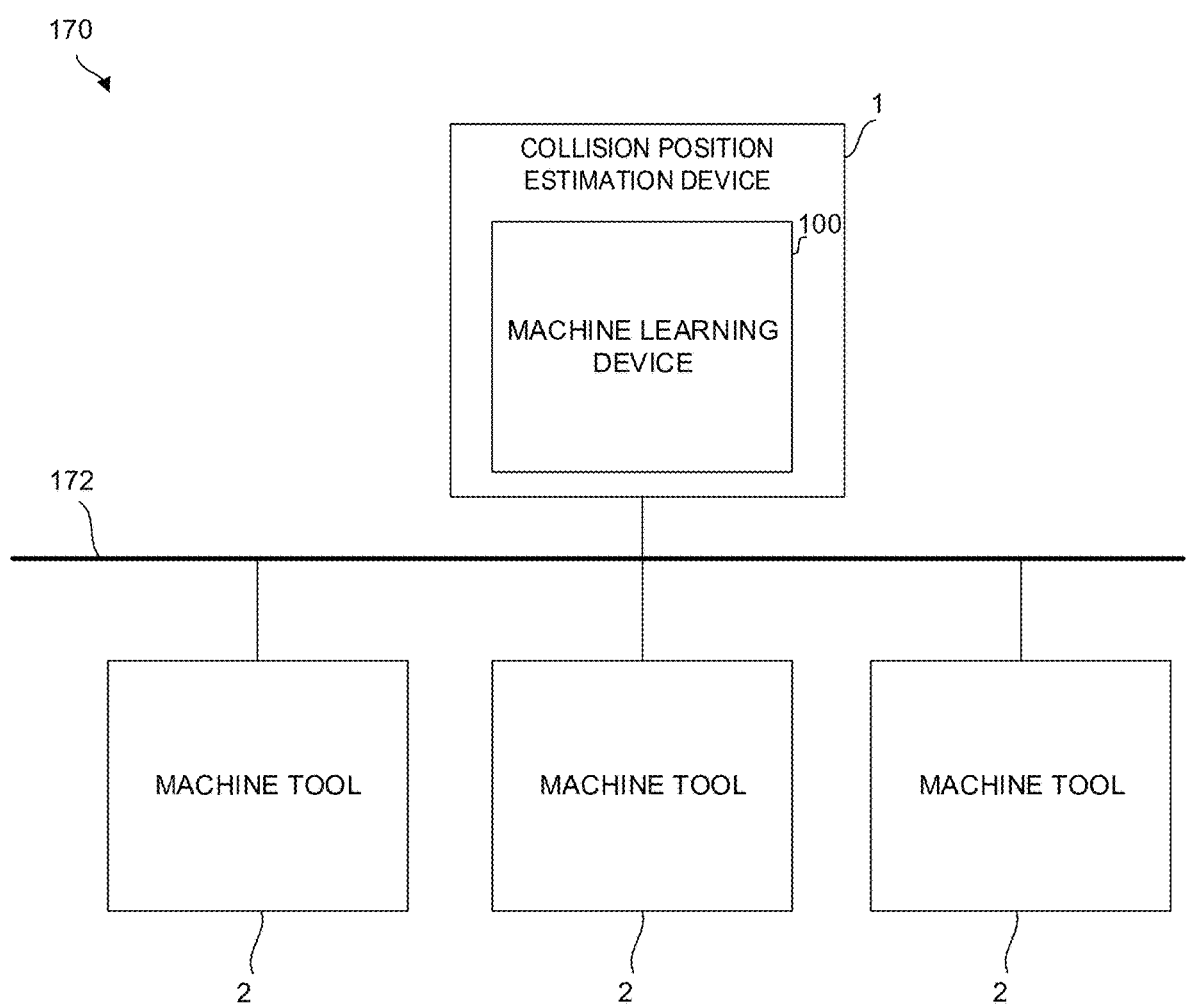
FIG. 5 is a schematic function block diagram illustrating a mode of a system incorporating the collision position estimation device.

FIG. 5 illustrates a system 170 according to an embodiment including the collision position estimation device 1. The system 170 includes at least one collision position estimation device 1 mounted as a part of a computer such as a cell computer, a host computer, a cloud server, etc., a plurality of machine tools 2, and a wired/wireless network 172 for connecting the collision position estimation device 1 and the machine tools 2 to each other.

In the system 170 having the above configuration, the collision position estimation device 1 including the machine learning device 100 can automatically and accurately obtain the axis position of the machine tool 2 at the time of collision of the cushion member of the telescopic cover with respect to the information related to movement of the axis included in the machine tool 2 and the data related to the torque of the servomotor 50 driving the axis by each of the machine tools 2 using the learning result of the learning unit 110 for each of the machine tools 2. In addition, the machine learning device 100 of the collision position estimation device 1 may learn the axis position of the machine tool 2 at the time of collision of the cushion member of the telescopic cover with respect to the information related to movement of the axis included in the machine tool 2 and the data related to the torque of the servomotor 50 driving the axis common to all the machine tools 2 based on the state variable S and the label data L obtained for each of the plurality of machine tools 2, and a learning result thereof may be shared among the machine tools 2. Therefore, according to the system 170, it is possible to improve the speed and reliability of learning of the axis position of the machine tool 2 at the time of collision of the cushion member of the telescopic cover with respect to the information related to movement of the axis included in the machine tool 2 and the data related to the torque of the servomotor 50 driving the axis using more diverse data sets (including the state variable S and the label data L) as an input.

Even though the embodiment of the application has been described above, the application is not limited only to the examples of the above-described embodiment, and can be implemented in various aspects by making appropriate changes.

For example, a learning algorithm and a calculation algorithm executed by the machine learning device 100, a control algorithm executed by the collision position estimation device 1, etc. are not limited to those described above, and various algorithms can be adopted.

In addition, in the above embodiment, the collision position estimation device 1 and the machine learning device 100 are described as devices having different CPUs. However, the machine learning device 100 may be realized by the CPU 11 included in the collision position estimation device 1 and the system program stored in the ROM 12.

The invention claimed is:

1. A collision position estimation device for estimating a position of an axis of a machine tool during collision of a cushion member included in a telescopic cover, the collision position estimation device comprising:
a machine learning device including a processor configured to learn the position of the axis during collision of the cushion member,
wherein the processor is configured to
observe axis movement data indicating information related to movement of the axis and motor torque data indicating data related to a torque of a motor driving the axis as a state variable representing a current state of an environment,
acquire collision position data indicating the position of the axis during collision of the cushion member as label data, and
associate and learn the information related to movement of the axis and the data related to the torque of the motor driving the axis with the position of the axis during collision of the cushion member using the state variable and the label data, and
wherein the learned information related to movement of the axis is used to estimate a state, normal or abnormal, of the cushion member.

2. The collision position estimation device according to claim 1, wherein the information related to movement of the axis includes a position command and a feed speed commanded with respect to the axis.

3. The collision position estimation device according to claim 1, wherein the data related to the torque of the motor driving the axis includes a torque command of the motor.

4. The collision position estimation device according to claim 3, wherein
the data related to the torque of the motor driving the axis includes the torque command in a vicinity of a time at which the cushion member collides with a part of the machine tool and a time at which vibration is generated when the cushion member collides with the part of the tool machine.

5. The collision position estimation device according to claim 1, wherein the processor is further configured to
compute an error between a correlation model for estimating the position of the axis during collision of the cushion member from the state variable and a correlation characteristic identified from teacher data prepared in advance, and
update the correlation model to reduce the error.

6. The collision position estimation device according to claim 1, wherein the processor is further configured to calculate the state variable and the label data in a multi-layer structure.

7. The collision position estimation device according to claim 1, wherein the machine learning device is present in a cloud server.

8. A collision position estimation device for estimating a position of an axis of a machine tool during collision of a cushion member included in a telescopic cover, the collision position estimation device comprising
a machine learning device including a processor configured to learn the position of the axis during collision of the cushion member,
wherein the processor is configured to
observe axis movement data indicating information related to movement of the axis and motor torque data indicating data related to a torque of a motor driving the axis as a state variable representing a current state of an environment,
associate and learn the information related to movement of the axis and the data related to the torque of the motor driving the axis with the position of the axis during collision of the cushion member, and
output a result of estimating collision position data indicating the position of the axis during collision of the cushion member based on an observed state variable and a learning result, and
wherein the learned information related to movement of the axis is used to estimate a state, normal or abnormal, of the cushion member.

9. The collision position estimation device according to claim 8, wherein
the data related to the torque of the motor driving the axis includes a torque command of the motor in a vicinity of a time at which the cushion member collides with a part of the machine tool and a time at which vibration is generated when the cushion member collides with the part of the tool machine.

10. A machine learning device for learning a position of an axis of a machine tool during collision of a cushion member included in a telescopic cover, the machine learning device comprising a processor configured to:
observe axis movement data indicating information related to movement of the axis and motor torque data indicating data related to a torque of a motor driving the axis as a state variable representing a current state of an environment,
acquire collision position data indicating the position of the axis during collision of the cushion member as label data, and
associate and learn the information related to movement of the axis and the data related to the torque of the motor driving the axis with the position of the axis during collision of the cushion member using the state variable and the label data,
wherein the learned information related to movement of the axis is used to estimate a state, normal or abnormal, of the cushion member.

11. The machine learning device according to claim 10, wherein
the data related to the torque of the motor driving the axis includes a torque command of the motor in a vicinity of a time at which the cushion member collides with a part of the machine tool and a time at which vibration is generated when the cushion member collides with the part of the tool machine.

12. A machine learning device for learning a position of an axis of a machine tool during collision of a cushion member included in a telescopic cover, the machine learning device comprising a processor configured to:
observe axis movement data indicating information related to movement of the axis and motor torque data indicating data related to a torque of a motor driving the axis as a state variable representing a current state of an environment,
associate and learn the information related to movement of the axis and the data related to the torque of the motor driving the axis with the position of the axis during collision of the cushion member, and
output a result of estimating collision position data indicating the position of the axis during collision of the cushion member based on an observed state variable and a learning result,
wherein the learned information related to movement of the axis is used to estimate a state, normal or abnormal, of the cushion member.

13. The machine learning device according to claim 12, wherein
the data related to the torque of the motor driving the axis includes a torque command of the motor in a vicinity of a time at which the cushion member collides with a part of the machine tool and a time at which vibration is generated when the cushion member collides with the part of the tool machine.

* * * * *